United States Patent

Bulan et al.

Patent Number: 5,164,052
Date of Patent: Nov. 17, 1992

[54] PROCESS FOR THE PURIFICATION OF ANHYDROUS HYDROGEN FLUORIDE

[75] Inventors: Andreas Bulan, Langenfeld; Michael Krancher, Cologne, both of Fed. Rep. of Germany

[73] Assignee: Bayer Aktiengesellschaft, Leverkusen, Fed. Rep. of Germany

[21] Appl. No.: 766,116

[22] Filed: Sep. 27, 1991

[30] Foreign Application Priority Data

Oct. 9, 1990 [DE] Fed. Rep. of Germany ....... 4031967

[51] Int. Cl.$^5$ ............................................... C25B 1/24
[52] U.S. Cl. .................................................... 204/130
[58] Field of Search ......................................... 204/130

[56] References Cited

FOREIGN PATENT DOCUMENTS 4325135 6/1964 Japan.

OTHER PUBLICATIONS

Chemical Abstracts, vol. 75, No. 10; 105:R; (1971).

Primary Examiner—T. M. Tufariello
Attorney, Agent, or Firm—Connolly and Hutz

[57] ABSTRACT

Impure anhydrous hydrogen fluoride is purified by removing metallic and non-metallic impurities by electrolysis under conditions whereby no explosive gas mixture is formed in the electrolytic cell.

6 Claims, No Drawings

PROCESS FOR THE PURIFICATION OF ANHYDROUS HYDROGEN FLUORIDE

This invention relates to a process for the removal of metallic and non-metallic impurities such as compound of boron, silicon, phosphorus, arsenic and sulphur from anhydrous commercial hydrogen fluoride.

BACKGROUND OF THE INVENTION

The term "anhydrous hydrogen fluoride" is used here to denote a hydrogen fluoride obtained by a conventional technical process. In particular, its water content should be below 5000 ppm.

Pure anhydrous hydrogen fluoride is an important chemical product for a large number of applications and the abovementioned impurities are found to be troublesome accompanying substances in anhydrous commercial hydrogen fluoride.

Distillative processes are already in use for the purification of anhydrous commercial hydrogen fluoride, for example as described in U.S. Pat. No. 3,687,622. Distillative processes carried out with the addition of auxiliary substances are also known (U.S. Pat. No. 4,756,899) but these processes are technically complicated and not always capable of yielding sufficiently pure products. Moreover, distillative processes invariably give rise to product fractions in which the impurities have accumulated and which are very limited in their use.

Both distillative processes with the addition of auxiliary agents (DD 62309) and electrolytic processes (JP 46-15768) are known for the purification of aqueous solutions of hydrogen fluoride. It is also known that in particular the element arsenic can be removed from aqueous solutions of hydrogen fluoride by passing inert gases over the hydrogen fluoride (DD 254372). The disadvantage of the electrolytic process is that some of the other elements mentioned above can only be removed very incompletely, if at all. Moreover, the product obtained by this process is, of course, an aqueous solution of hydrogen fluoride, which cannot be used universally for all subsequent processes. In addition, the preparation of anhydrous hydrogen fluoride from aqueous solutions of hydrogen fluoride can only be achieved with great difficulty. Conversely, on the other hand, aqueous solutions with varying HF contents can easily be prepared from purified anhydrous hydrogen fluoride.

The problem therefore which arose is for finding a process of purification for anhydrous commercial hydrogen fluoride in which the disadvantages of the distillative processes would be avoided and as far as possible all impurities would be removed.

This problem has been solved by the purification process according to the invention.

BRIEF DESCRIPTION OF THE INVENTION

It has been surprisingly discovered that impure anhydrous commercial hydrogen fluoride containing metallic and non-metallic impurities can be purified by subjecting the impure anhydrous hydrogen fluoride to electrolysis is an electrolytic cell under conditions whereby no explosive gas mixture is formed in the cell and whereby impurities are removed.

DETAILED DESCRIPTION

The invention relates to a process for the purification of anhydrous commercial hydrogen fluoride, in which metallic and non-metallic impurities are removed from commercial anhydrous hydrogen fluoride by electrolysis and the electrolysis is carried out under such conditions that no explosive gas mixtures are formed in the electrolytic cell.

The main metallic and non-metallic impurities removed are compounds of boron, silicon, phosphorus, arsenic and sulphur.

The troublesome arsenic compounds in particular are removed from anhydrous commercial hydrogen fluoride.

The electrolysis is preferably carried out at voltages above 1.5 Volts.

There is no recognisable upper limit for the operating voltage but there appears to be no advantage in carrying out the electrolysis at voltages above 50 V.

Voltages from 2.5 V to 10 V are particularly preferred.

The electrolysis is preferably carried out with electrodes of carbon, platinum, nickel, cobalt or a combination of these elements. The geometrical form of the electrodes is of no significance in this process.

The electrolysis is preferably carried out with nickel electrodes of any form.

In the process according to the invention, the operating temperature is in particular so chosen that the hydrogen fluoride is liquid at the chosen operating pressure.

The electrolysis is most preferably carried out at normal pressure.

The duration of the process according to the invention depends on the desired purity of the product and the quantity of impurities initially present. Electrolysis may be continued until the desired degree of purity has been reached. For a given degree of purity, the electrolysis time may be reduced by increasing the electrolytic voltage and/or increasing the electrode surface area.

It is particularly preferred to flush the electrolytic cell with inert gas during the process in order to prevent the formation of explosive gas mixtures.

For safety reasons, it is necessary to prevent the formation of explosive gas mixtures in the electrolytic cell. This may be achieved in the process according to the invention, as already mentioned, by flushing the electrolytic cell with a stream of inert gas which is large enough to prevent the formation of explosive mixtures in the electrolytic cell. The inert gases used may be, for example, nitrogen, helium, argon or carbon dioxide. If other means are used to ensure that no explosive gas mixtures can form in the electrolytic cell, e.g. separate removal of the gases formed at the anode and at the cathode, the flushing with inert gas may be omitted without any disadvantage to the process.

It is an advantage of the process according to the invention that anhydrous commercial hydrogen fluoride can very easily be freed from unwanted impurities, including elements which can only be removed incompletely or not at all by other processes. Further, the process avoids the formation of product fractions in which the impurities accumulate and which are therefore difficult to utilise.

The invention will now be described in more detail with the aid of the following Examples which are not to be regarded as limiting.

EXAMPLE 1

1500 ml of anhydrous commercial hydrogen fluoride containing the impurities shown in the Table are subjected to electrolysis in a 2000 ml electrolytic cell equipped with electrodes of nickel plates. A current of from 1.0 A to 0.3 A flowed at a voltage of 5.0 V. A stream of nitrogen sufficient to prevent the formation of explosive mixtures was passed through the electrolytic cell during electrolysis. After an electrolysis period of 48 hours, the level of impurities had reduced to the values shown in the Table.

TABLE

| Element | Impurities in ppm | |
|---|---|---|
| | Before electrolysis | After electrolysis |
| B | 0.9 | <0.3 |
| Si | 35 | 5 |
| P | 5.3 | 1.0 |
| As | 9.3 | 0.019 |
| S | 3700 | <30 |

EXAMPLE 2

Anhydrous commercial hydrogen fluoride having an arsenic content of 11.5 ppm was subjected to electrolysis in the same electrolytic cell as in Example 1 equipped with electrodes of nickel mesh. A current of from 0.3 A to 0.1 A flowed at a voltage of 5 V. The electrolytic cell was rendered inert with nitrogen as in Example 1. An arsenic content of 0.014 ppm was measured in the purified hydrogen fluoride after 72 hours.

EXAMPLE 3

Anhydrous commercial hydrogen fluoride of the same quality as in Example 2 was left in the electrolytic cell described in Example 1 for 72 hours to serve as control. The cell was made inert with nitrogen but no electrolysis was carried out. No reduction in the arsenic content of the hydrogen fluoride was found at the end of the experiment.

What is claimed is:

1. A process for the purification of impure anhydrous commercial hydrogen fluoride containing metallic and non-metallic impurities comprising compounds of boron, silicon, phosphorus, arsenic and sulphur wherein said impurities are removed from the anhydrous commercial hydrogen fluoride by electrolysis with electrodes comprising carbon, platinum, nickel, cobalt or a combination thereof at voltages above 1.5 volts and at temperatures at which the hydrogen fluoride is liquid at the operating pressure and under conditions whereby no explosive gas mixture is formed in the electrolytic cell and wherein the purification is conducted in the absence of ion exchange resin.

2. A process according to claim 1 wherein arsenic compounds are removed from the hydrogen fluoride.

3. A process according to claim 1 wherein electrolysis is carried out at voltages from 2.5 volts to 10 volts.

4. A process according to claim 1 wherein electrolysis is carried out with electrodes of nickel.

5. A process according to claim 1 wherein electrolysis is carried out at atmospheric pressure.

6. A process according to claim 1 wherein formation of explosive gas mixtures is prevented by flushing the electrolytic cell with inert gas.

* * * * *